United States Patent [19]

Rao

[11] 4,192,912

[45] Mar. 11, 1980

[54] CELLS HAVING CATHODES WITH THIOCYANOGEN-CONTAINING CATHODE-ACTIVE MATERIALS

[75] Inventor: Bhaskara M. L. Rao, Fanwood, N.J.

[73] Assignee: Exxon Research & Engineering Co., Florham Park, N.J.

[21] Appl. No.: 16,503

[22] Filed: Mar. 1, 1979

[51] Int. Cl.² .............................................. H01M 6/16
[52] U.S. Cl. ................................... 429/105; 429/218
[58] Field of Search ................ 425/105, 101, 102, 218

[56] References Cited

U.S. PATENT DOCUMENTS

| | | | |
|---|---|---|---|
| 2,937,219 | 5/1960 | Minnick et al. | 429/105 |
| 3,445,290 | 5/1969 | Elliott et al. | 429/199 |

Primary Examiner—Donald L. Walton
Attorney, Agent, or Firm—Kenneth P. Glynn

[57] ABSTRACT

An electric current-producing cell which contains:
(a) an anode metal higher than hydrogen in the electromotive series and having an atomic number no greater than 30;
(b) a cathode material containing thiocyanogen, said material being selected from the group consisting of:
  (i) thiocyanogen of the formula:

$$(SCN)_2;$$

(ii) parathiocyanogen of the formula:

$$(SCN)_x$$

wherein x is greater than 2;
  (iii) halothiocyanogen of the formula:

$$YSCN$$

wherein Y is a halogen selected from the group consisting of F, Cl, Br and I;
  (iv) parahalothiocyanogen of the formula:

$$(YSCN)_y$$

wherein Y is as described above and wherein y is equal to or greater than 2;
  (v) perthiocyanogen complex of an amine;
  (vi) perthiocyanogen complex of an ammonium ion;
  (vii) thiocyanogen complex of a metal cation which is the same as the metal cation in the anode;
  (viii) thiocyanogen complex of a metal cation which is higher in the electromotive series than the metal cation in the anode;
  (ix) cathode intercalated material having halothiocyanogen of paragraph (iii) above intercalated therein;
  (x) cathode intercalated material having parahalothiocyanogen of paragraph (iv) above intercalated therein;
  (xi) polymeric thiocyanogen-containing material obtained from oxidation of a polyvinyl thiocyanate;
  (xii) ammonium thiocyanate salt complex of thiocyanogen of paragraph (i) above;
  (xiii) ammonium thiocyanate salt complex of parathiocyanogen of paragraph (ii) above;
  (xiv) ammonium thiocyanate salt complex of halothiocyanogen of paragraph (iii) above; and
  (xv) ammonium thiocyanate salt complex of parahalothiocyanogen of paragraph (iv) above; and
(c) an electrolyte which is chemically inert with respect to said anode and said cathode.

10 Claims, 2 Drawing Figures

FIG-1 RECHARGABLE Li/(SCN)$_2$ CELL

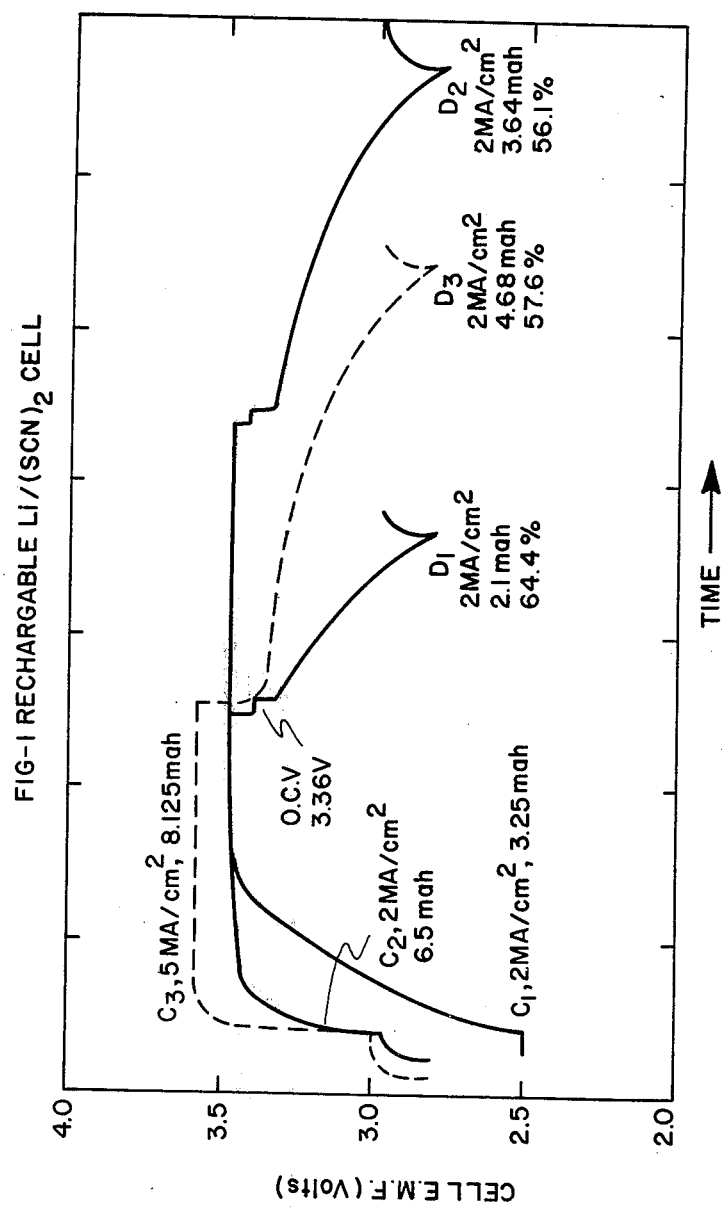

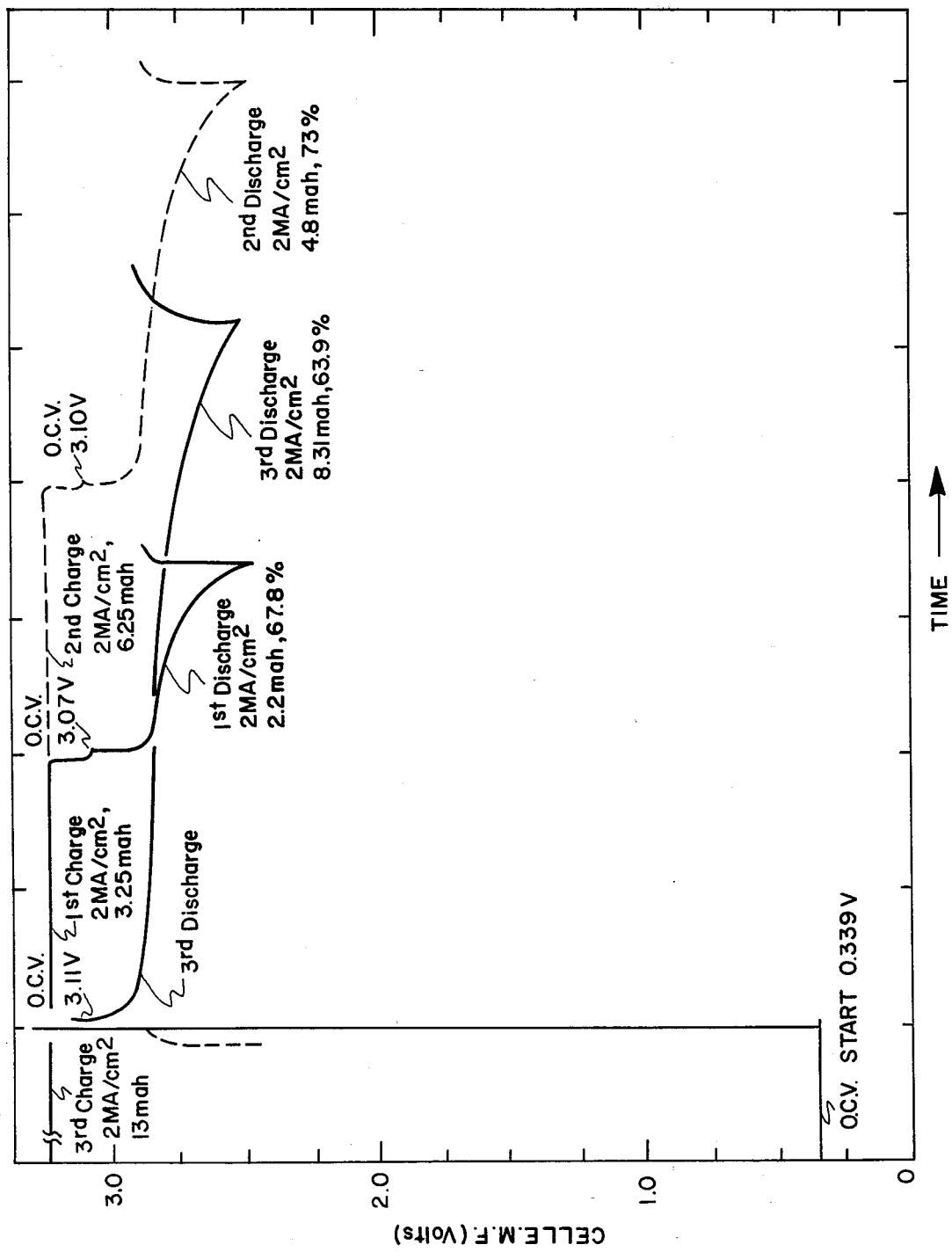

CELLS HAVING CATHODES WITH THIOCYANOGEN-CONTAINING CATHODE-ACTIVE MATERIALS

BACKGROUND OF THE INVENTION

1. Field of the Invention

The present invention relates to electric current-producing cells, and more particularly to such cells employing specified cathode-active materials containing thiocyanogen.

2. Prior Art

There has been considerable interest in recent years in developing high energy density batteries based on voltaic cells. Exemplary of the developing systems is a high energy density electrochemical cell utilizing compounds of the transition metal chalcogenides such as titanium disulfide as cathode-active materials and using alkali metal anodes, e.g., as set forth in U.S. Pat. No. 4,009,052. Additionally, there has been substantial activity in the development of many types of cells using alkali metal active-material anodes and a variety of cathodes. Among these developments are the primary cells described in U.S. Pat. No. 3,445,290 containing alkali metal anodes and cathodes employing silver thiocyanate and copper thiocyanate cathode-active materials. Although these systems contain metal thiocyanates, they are unlike the present invention in that the cation rather than the anion of the cathode-active material is the participating ion, e.g., silver ions goes to silver metal on electrochemical action. Also, Semones et al, Technical Report AFAPL-TR-71-82, National Technical Information Service (Sept., 1971) describe cells having lithium anodes, thiocyanate electrolytes and $Ni(SCN)_2$ and $Co(SCN)_2$ cathodes. Again, this teaching involves the use of anion rather than a cation participation.

Notwithstanding the considerable variety of high energy density electrochemical cell systems which have recently been developed, it is believed that the particular cells of the present invention, which utilize relatively inexpensive yet relatively active thiocyanogen-containing cathode-active materials as specified, have not been heretofore disclosed or rendered obvious.

BRIEF DESCRIPTION OF THE DRAWING

FIGS. 1 and 2 are graphs showing cycling date for $Li/(SCN)_2$ and $LiAl/(SCN)_2$ cells respectively.

SUMMARY OF THE INVENTION

The present invention is directed to an electric current-producing cell which contains:

(a) an anode having as its anode-active material one or more metals higher than hydrogen in the electromotive series and having an atomic number no greater than 30;

(b) a cathode having as its cathode-active material one or more materials containing thiocyanogen, said materials being selected from the group consisting of:
  (i) thiocyanogen of the formula:
    $(SCN)_2$;

(ii) parathiocyanogen of the formula:
    $(SCN)_x$ wherein x is greater than 2;
  (iii) halothiocyanogen of the formula
    YSCN wherein Y is a halogen selected from the group consisting of F, Cl, Br and I;
  (iv) parahalothiocyanogen of the formula:

$(YSCN)_y$ wherein Y is as described above and wherein y is equal to or greater than 2;
  (v) perthiocyanogen complex of an amine;
  (vi) perthiocyanogen complex of an ammonium ion;
  (vii) thiocyanogen complex of a metal cation which is the same as the metal cation in the anode;
  (viii) thiocyanogen complex of a metal cation which is higher in the electromotive series than the metal cation in the anode;
  (ix) cathode intercalated material having halothiocyanogen of paragraph (iii) above intercalated therein;
  (x) cathode intercalated material having parahalothiocyanogen of paragraph (iv) above intercalated therein;
  (xi) polymeric thiocyanogen-containing material obtained from oxidation of a polyvinyl thiocyanate;
  (xii) ammonium thiocyanate salt complex of thiocyanogen of paragraph (i) above;
  (xiii) ammonium thiocyanate salt complex of parathiocyanogen of paragraph (ii) above;
  (xiv) ammonium thiocyanate salt complex of halothiocyanogen of paragraph (iii) above; and
  (xv) ammonium thiocyanate salt complex of parahalothiocyanogen of paragraph (iv) above; and (c) an electrolyte which is chemically inert with respect to said anode and said cathode and which permits the migration of ions between said anode and said cathode.

DETAILED DESCRIPTION OF THE INVENTION

As mentioned, the electric current-producing cell of the present invention is one which contains a specified anode, a functional electrolyte, and a cathode having thiocyanogen-containing cathode-active material.

In general, the anode employed in the cell of the present invention is one which contains as its anode-active material one or more metals higher than hydrogen in the electromotive series and having an atomic number no greater than 30. Of these metals, known as the alkali metals, lithium, sodium, iron, cobalt, nickel, copper and zinc are desirable. Preferred is the anode having lithium, iron, copper or zinc as its anode-active material, especially lithium. It should be noted that the metals used in the anodes are meant to include both pure metals and alloys containing these, e.g., lithium-aluminum alloys. The anode-active material may be in contact with other metal structures in the cell of the present invention, as desired. Thus, the anode-active materials, e.g., lithium, may be in contact with metal structures such as nickel, copper or silver screen, which serve as current collectors. These anode configurations are a matter of design and are well known in the art.

The cathode employed in the cell of the present invention has as its cathode-active material one or more specified materials containing thiocyanogen. These materials include the following:
  (i) thiocyanogen having the formula:

$(SCN)_2$;

(ii) parathiocyanogen of the formula:

$(SCN)_x$ wherein x is greater than 2. In general, the variable x may be any numerical value greater than 2 including extremely large values signifying very long chained macropolymers. Lower values, e.g., 3, 4 or the like are also contemplated;

(iii) halothiocyanogen of the formula:

YSCN wherein Y is a halogen selected from the group consisting of F, Cl, Br and I. Of these halogens, Cl, Br and I are preferred;

(iv) parahalothiocyanogen of the formula:

$(YSCN)_y$ wherein Y is as described above and wherein y is equal to or greater than 2. As with x in the parathiocyanogen above, a broad range of values for y is contemplated including polymeric resulting values and lower values;

(v) perthiocyanogen complex of an amine. These include the known complexes such as trimethyl amine thiocyanogen complex and the like as well as the known polyamide thiocyanogen complex, e.g., polyvinylpyridine perthiocyanogen complex;

(vi) perthiocyanogen complex of an ammonium ion. Again, these include the known complexes such as ammonium thiocyanogens, e.g., $NH_4(SCN)_3$ and $NH_4(SCN)_a$ wherein a is any value greater than 3, e.g. up to 10;

(vii) thiocyanogen complex of a metal ion which is the same as the metal cation in the anode. For example, with lithium, sodium, potassium, and zinc anodes, respectively, the cathodes could be $Li(SCN)_3^-$, $Na(SCN)_3^-$, $K(SCN)_3^-$ and $Zn(SCN)_3^-$. Also, higher numbers of thiocyanogen are included, e.g., $Li(SCN)_b^-$ wherein b is a value greater than 2;

(viii) thiocyanogen complex of a metal cation which is higher in the electromotive series than the metal cation in the anode. Thus, with a zinc anode, the cathode could be $Na(SCN)_3^-$, $K(SCN)_3^-$, $Li(SCN)_3^-$ and the like, as well as those having greater numbers of thiocyanogen units, i.e., the $Na(SCN)_b^-$ type;

(ix) cathode intercalated material having halothiocyanogen of the formula in subparagraph (iii) above intercalated therein. These include materials such as graphite with halothiocyanogens such as ClSCN and BrSCN contained therein in an intercalated manner. Also included are materials such as the known intercalatable chalcogenides, i.e., oxides, sulfides, selenides and tellurides, which have been used as intercalatable cathode materials in the past, except that halothiocyanogens such as FSCN, BrSCN or mixtures of any of these types are intercalated therein. Intercalation is achieved by chemical and/or electrochemical treatments;

(x) cathode intercalated material having parahalothiocyanogen of the formula in subparagraph (iv) above intercalated therein. These are similar to the material described in subparagraph (ix) above, except that the para compounds $(YSCN)_y$ are employed;

(xi) polymeric thiocyanogen-containing material obtained from oxidation of a polyvinyl thiocyanate. This is achieved by chemical and/or electrochemical oxidation;

(xii) ammonium thiocyanate complex of thiocyanogen $(SCN)_2$. This includes the alkyl and aryl ammonium thiocyanate thiocyanogen complexes as well as the quaternary ammonium thiocyanate thiocyanogen complexes. For example, those of the formula $R_4NSCN.(SCN)_2$ wherein R is one or more of alkyls, e.g. $CH_3$, $C_2H_5$, etc., aryls, e.g. $C_6H_5$, and hydrogen, subject to the proviso that not all Rs are hydrogen. Also included are those of the formula $R'SCN.(SCN)_2$ wherein R' is a quaternary radical such as pyridinium, quinolinium and morpholinium;

(xiii) ammonium thiocyanate complex of parathiocyanogen of the formula $(SCN)_x$ as defined above. This includes those of the formulas $R_4NSCN.(SCN)_x$ and $R'SCN.(SCN)_x$ wherein all of the variables are defined above;

(xiv) ammonium thiocyanate complex of halothiocyanogen of the formula YSCN. This includes those of the formulas $R_4NSCN.YSCN$ and $R'SCN.YSCN$ wherein the variables are as defined above;

(xv) ammonium thiocyanate complex of parahalothiocyanogen of the formula $(YSCN)_y$. This includes those of the formulas $R_4NSCN.(YSCN)_y$ and $R'SCN.(YSCN)_y$.

Of the foregoing, those thiocyanogens described in paragraphs (i) through (viii) are desirable, and those of paragraphs (i) through (iv) are preferred.

All of the above thiocyanogen-containing materials are well known in the art with the exception of the thiocyanogen-containing material intercalation species. Methods of making these are well published and are within the purview of the artisan.

Advantageously, the cathode-active materials used in the cells of the present invention may simply be present in dissolved state, or be pressed or hot pressed into a cathode structure, with or without catalysts and/or supporting materials. The cathode-active material may be supported on structures such as carbon, copper, nickel, stainless steel, iron, etc., and it may be supported on such materials or it may be impregnated into such materials. In one preferred embodiment, the cathode does not contain any conductive diluents within the cathode-active material, such as elemental carbon. However, plastic binding agents such as polyfluoroethylene may be utilized if desired.

The electrolyte used in the cell of the present invention is any electrolyte which is chemically inert with respect to the anode and with respect to the cathode, and which permits the migration of ions between the anode and the cathode. The electrolyte may typically be a nonaqueous metal salt-organic solvent electrolyte solution, e.g., an alkali metal salt-organic solvent electrolyte solution. These metal salts are well known in the art and need not be enumerated herein. However, such salts include the lithium and sodium salt complexes which are dissolved in organic solvents such as inertly substituted and unsubstituted ethers, sulfones, organic sulfates, organic sulfites, organic nitriles, organic nitro compounds and cyclic esters. One preferred electrolyte for use in conjunction with cells containing lithium as its anode-active material is an electrolyte containing lithium thiocyanate salt dissolved in dioxolane or dioxolane-containing solution. Alternatively, the electrolyte may be a solid such as beta-alumina or an alkali metal halide, or a molten salt. Other electrolytes compatible with the particular anode being used include gel or pastes of conducting solutions containing thiocyanate anions.

The electrolyte used in the cell of the present invention may also be a nonaqueous alkali metal salt-inorganic solvent electrolyte solution. U.S. Pat. Nos. 3,891,457, 3,891,458 and 3,966,490, describe cells having carbon cathodes in the inorganic electrolyte system in which the inorganic solvent acts as an active cathodic depolarizer as well as a solvent. The inorganic electrolyte has an inorganic solvent material selected from the group consisting of phosphorus oxychloride, monofluorophosphoryl dichloride, thionyl chloride, sulfuryl chloride, and mixtures thereof. A solute is dissolved in the inorganic solvent which provides the cation of the anode metal and at least one anion of the general formula $JZ_4^-$, $QX_6^-$, and $LX_6^-$, where J is an element selected from the group consisting of boron and aluminum, Q is an element selected from the group consisting of phosphorus, arsenic, and antimony, L is an element selected from the group consisting of tin, zirconium, and titanium, and X is any halogen. Thus, electrolytes for use in conjunction with cells containing lithium as its anode-active material are the lithium aluminum halides, e.g., lithium tetrachloroaluminate. Another useful salt is thionyl chloride. Thus, these lithium salts are the lithium boron halides, the lithium aluminum halides, the lithium phosphorus halides, the lithium arsenic halides, the lithium antimony halides, the lithium tin halides, the lithium zirconium halides, the lithium titanium halides and mixtures thereof.

The electric current-producing cells of the present invention containing the above-mentioned anodes, cathodes and electrolytes not only have high energy densities, but many are also capable of being cycled through charging and discharging, and may be readily produced on a large-scale basis.

The present invention is illustrated by the following examples, but the invention should not be construed by being limited thereto.

EXAMPLE 1

A rechargeable high energy density Li/(SCN)$_2$ cell of theoretical energy density of 1384 wh/Kg, with an open circuit voltage of 3.35v may be formed using an inert metal substrate for lithium, or using lithium foil anode for the −ve terminal, a carbon electrode for +ve terminal and an organic electrolyte containing lithium thiocyanate. The cell formed represents assembly in discharged state, and upon charging reactions represented in equation (1) to (4) occur leading to the formation of rechargeable Li/(SCN)$_2$ cell.

In the electrolyte:

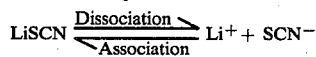  Eq. (1)

At the negative electrode:

  Eq. (2)

At the positive electrode:

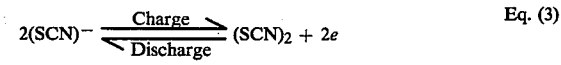  Eq. (3)

Overall Cell Reaction:

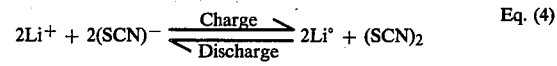  Eq. (4)

FIG. 1 gives the behavior of Li/(SCN)$_2$ cell formed by using 1″×1″ lithium foil and a porous carbon electrode (10% teflon binder, ∼60% porous, ∼0.05″ thick, tantalum current collector). The cell was assembled in a parallel plate configuration using a layer of celgard and a layer of fibre-glass separator, and a polyethylene bag container. The cell contained 5 ml of 3M LiSCN in dioxolane as electrolyte.

Upon charging, the open circuit voltage of 3.35v is observed for Li/(SCN)$_2$ cell. Cycling data presented in FIG. 1 illustrates the cell is rechargeable.

EXAMPLE 2

A LiAl/(SCN)$_2$ cell with 1″×1″ electrodes was assembled in a manner described in Example 1, using an electrode made from wrapping aluminum foil around a tantalum grid, instead of the lithium foil for the −ve electrode. The purpose in using aluminum electrode instead of an inert metal foil or lithium was to illustrate the formation of LiAl/(SCN)$_2$ cell upon charging the cell. This is illustrated in FIG. 2.

The cell exhibited an open circuit voltage of 0.339v upon addition of 5 ml. of 3M LiSCN dioxolane electrolyte. The cell was then charged at 2 mA/cm$^2$ and an open circuit voltage of ∼3.1 was registered which is due to the formation of LiAl/(SCN)$_2$ cell. Cycling data shown in FIG. 2 evidences rechargeability of the cell.

What is claimed is:

1. An electric current-producing cell, comprising:
(a) an anode having as its anode-active material one or more metals higher than hydrogen in the electromotive series and having an atomic number no greater than 30;
(b) a cathode having as its cathode-active material one or more materials containing thiocyanogen, said materials being selected from the group consisting of:
   (i) thiocyanogen of the formula:

(SCN)$_2$;

(ii) parathiocyanogen of the formula:

(SCN)$_x$ wherein x is greater than 2;
   (iii) halothiocyanogen of the formula:

YSCN wherein Y is a halogen selected from the group consisting of F, Cl, Br and I;
   (iv) parahalothiocyanogen of the formula:
   (YSCN)$_y$ wherein Y is as described above and wherein y is equal to or greater than 2;
   (v) perthiocyanogen complex of an amine;
   (vi) perthiocyanogen complex of ammonium cation;
   (vii) thiocyanogen complex of a metal cation which is the same as the metal cation in the anode;

(viii) thiocyanogen complex of a metal cation which is higher in the electromotive series than the metal cation in the anode;
(ix) cathode intercalated material having halothiocyanogen of paragraph (iii) above intercalated therein;
(x) cathode intercalated material having parahalothiocyanogen of paragraph (iv) above intercalated therein;
(xi) polymeric thiocyanogen-containing material obtained from oxidation of a polyvinyl thiocyanate;
(xii) ammonium thiocyanate salt complex of thiocyanogen of paragraph (i) above;
(xiii) ammonium thiocyanate salt complex of parathiocyanogen of paragraph (ii) above;
(xiv) ammonium thiocyanate salt complex of halothiocyanogen of paragraph (iii) above; and
(xv) ammonium thiocyanate salt complex of parahalothiocyanogen of paragraph (iv) above; and
(c) an electrolyte which is chemically inert with respect to said anode and said cathode and which permits the migration of ions between anode and said cathode.

2. The cell of claim 1 wherein said anode-active material is selected from the group consisting of alkali metals, iron, cobalt, nickel, copper and zinc.

3. The cell of claim 2 wherein said anode-active material is selected from the group consisting of lithium, iron, copper and zinc.

4. The cell of claim 2 wherein said cathode-active materials are selected from the group consisting of:
(i) thiocyanogen of the formula:

$(SCN)_2$;

(ii) parathiocyanogen of the formula:

$(SCN)_x$ wherein x is greater than 2;
(iii) halothiocyanogen of the formula:

YSCN wherein Y is a halogen selected from the group consisting of F, Cl, Br and I;
(iv) parahalothiocyanogen of the formula:

$(YSCN)_y$ wherein Y is as described above and wherein y is equal to or greater than 2;
(v) perthiocyanogen complex of an amine;
(vi) perthiocyanogen complex of ammonium cation;
(vii) thiocyanogen complex of a metal cation which is the same as the metal cation in the anode; and
(viii) thiocyanogen complex of a metal cation which is higher in the electromotive series than the metal cation in the anode.

5. The cell of claim 3 wherein said cathode-active materials are selected from the group consisting of:
(i) thiocyanogen of the formula:

$(SCN)_2$;

(ii) parathiocyanogen of the formula:

$(SCN)_x$ wherein x is greater than 2;
(iii) halothiocyanogen of the formula:

YSCN wherein Y is a halogen selected from the group consisting of F, Cl, Br and I;
(iv) parahalothiocyanogen of the formula:

$(YSCN)_y$ wherein Y is as described above and wherein y is equal to or greater than 2;
(v) perthiocyanogen complex of an amine;
(vi) perthiocyanogen complex of ammonium cation;
(vii) thiocyanogen complex of a metal cation which is the same as the metal cation in the anode; and
(viii) thiocyanogen complex of a metal cation which is higher in the electromotive series than the metal cation in the anode.

6. The cell of claim 2 wherein said cathode-active materials are selected from the group consisting of:
(i) thiocyanogen of the formula:

$(SCN)_2$;

(ii) parathiocyanogen of the formula:

$(SCN)_x$ wherein x is greater than 2;
(iii) halothiocyanogen of the formula:

YSCN wherein Y is a halogen selected from the group consisting of F, Cl, Br and I; and
(iv) parahalothiocyanogen of the formula:
$(YSCN)_y$ wherein Y is as described above and wherein y is equal to or greater than 2.

7. The cell of claim 3 wherein said cathode-active materials are selected from the group consisting of:
(i) thiocyanogen of the formula:

$(SCN)_2$;

(ii) parathiocyanogen of the formula:

$(SCN)_x$ wherein x is greater than 2;
(iii) halothiocyanogen of the formula:

YSCN wherein Y is a halogen selected from the group consisting of F, Cl, Br and I; and
(iv) parahalothiocyanogen of the formula:

$(YSCN)_y$ wherein Y is as described above and wherein y is equal to or greater than 2.

8. The cell of claim 1 wherein said anode-active material is lithium.

9. The cell of claim 8 wherein said cathode-active materials are selected from the group consisting of:
(i) thiocyanogen of the formula:

$(SCN)_2$;

(ii) parathiocyanogen of the formula:
$(SCN)_x$ wherein x is greater than 2;

(iii) halothiocyanogen of the formula:
YSCN wherein Y is a halogen selected from the group consisting of F, Cl, Br and I;

(iv) parahalothiocyanogen of the formula:
$(YSCN)_y$ wherein Y is as described above and wherein y is equal to or greater than 2;

(v) perthiocyanogen complex of an amine;
(vi) perthiocyanogen complex of ammonium cation;
(vii) thiocyanogen complex of a metal cation which is the same as the metal cation in the anode; and
(viii) thiocyanogen complex of a metal cation which is higher in the electromotive series than the metal cation in the anode.

10. The cell of claim 8 wherein said cathode-active materials are selected from the group consisting of:

(i) thiocyanogen of the formula:
$(SCN)_2$;

(ii) parathiocyanogen of the formula:
$(SCN)_x$ wherein x is greater than 2;

(iii) halothiocyanogen of the formula:
YSCN wherein Y is a halogen selected from the group consisting of F, Cl, Br and I; and (iv) parahalothiocyanogen of the formula:
$(YSCN)_y$ wherein Y is as described above and wherein y is equal to or greater than 2.

* * * * *